US007922109B2

(12) United States Patent
Persson et al.

(10) Patent No.: US 7,922,109 B2
(45) Date of Patent: Apr. 12, 2011

(54) THRUST BEARING FOR A GYRATORY CRUSHER AND METHOD OF SUPPORTING A VERTICAL SHAFT IN SUCH A CRUSHER

(75) Inventors: Sebastian Persson, Malmö (SE); Patrik Sjöberg, Malmö (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 12/642,293

(22) Filed: Dec. 18, 2009

(65) Prior Publication Data

US 2010/0155512 A1 Jun. 24, 2010

(30) Foreign Application Priority Data

Dec. 19, 2008 (SE) ...................................... 0802617

(51) Int. Cl.
*B02C 2/04* (2006.01)
(52) U.S. Cl. ..................... 241/30; 241/209; 241/213
(58) Field of Classification Search .................... 241/30, 241/207–216, 205
See application file for complete search history.

(56) References Cited

U.S. PATENT DOCUMENTS

| 2,833,486 | A |   | 5/1958 | MacLeod |         |
|-----------|---|---|--------|---------|---------|
| 3,788,569 | A |   | 1/1974 | Kemnitz |         |
| 4,034,922 | A |   | 7/1977 | Coxhill |         |
| 5,725,163 | A | * | 3/1998 | Eloranta et al. | 241/33 |
| 5,779,166 | A | * | 7/1998 | Ruokonen et al. | 241/213 |
| 6,213,418 | B1 |   | 4/2001 | Gabriel et al. |         |
| 6,328,237 | B1 | * | 12/2001 | Thysell | 241/213 |

FOREIGN PATENT DOCUMENTS

GB 689960 4/1953
WO WO 99/22869 5/1999

OTHER PUBLICATIONS

International Search Report mailed Mar. 17, 2010 issued in PCT Application No. PCT/SE2009/051414.

* cited by examiner

*Primary Examiner* — Mark Rosenbaum
(74) *Attorney, Agent, or Firm* — Drinker Biddle & Reath LLP (57) ABSTRACT

A gyratory crusher includes a crushing head on which a first crushing shell is mounted, and a frame on which a second crushing shell is mounted. The crusher has a thrust bearing which is made up of horizontal bearing plates and which is located between a vertical shaft and a piston arranged vertically below the vertical shaft. The crusher further has a first space, which is adapted to receive a variable amount of pressurized liquid, the first space being defined by the piston and a piston housing formed in the frame, and a second space which is adapted to receive, by way of a duct, pressurized liquid from the first space, the second space being located between the vertical shaft and the piston and at least partly accommodated in an opening in at least one of the bearing plates. The first space and the second space are adapted, by the liquid, to transmit forces from the crushing head to the piston housing, in order that the load on the thrust bearing is relieved.

12 Claims, 5 Drawing Sheets

THRUST BEARING FOR A GYRATORY CRUSHER AND METHOD OF SUPPORTING A VERTICAL SHAFT IN SUCH A CRUSHER

CROSS-REFERENCE TO PRIOR APPLICATION

This application claims priority to Swedish Application No. 0802617-1 filed Dec. 19, 2008, which is incorporated by reference herein.

BACKGROUND OF THE INVENTION

1. Technical Field

The present disclosure relates to a gyratory crusher, which includes a crushing head which is fixedly attached to an upper portion of a substantially vertical shaft and on which a first crushing shell is mounted, and a frame on which a second crushing shell is mounted, the second crushing shell defining, together with the first crushing shell, a crushing gap, the width of which is adjustable by changing the vertical position of the first crushing shell with respect to the vertical position of the second crushing shell by at least one adjusting device. The gyratory crusher further includes a thrust bearing which is made up of horizontal bearing plates and which is located between the vertical shaft and a piston arranged vertically below the vertical shaft. The thrust bearing is adapted to transmit forces from the crushing head to the frame.

The present disclosure further relates to a method of supporting a substantially vertical shaft in a gyratory crusher.

2. Background Art

A gyratory crusher of the kind stated above can be used for crushing, for example, ore and rock material into smaller size.

WO 99/22869 discloses a gyratory crusher, in which a crushing head is mounted on a gyrating vertical shaft. At its lower end the vertical shaft is supported on a thrust bearing including three horizontal bearing plates. A first bearing plate is attached to the vertical shaft, a second bearing plate is attached to a piston arranged below the vertical shaft, and a third bearing plate is slideably and rotatably arranged between the first and second bearing plates. The first and second bearing plates are generally made of a bearing metal, such as bronze, and the third bearing plate is often made of steel. The piston arranged below the vertical shaft forms part, along with a cylinder, of a hydraulic piston arrangement, by means of which the vertical position of the vertical shaft can be shifted for setting a desired crushing gap between the first and the second crushing shell.

A drawback of the crusher described above is that the horizontal bearing plates that are part thereof are exposed to considerable wear, which requires frequent replacement of the thrust bearing at a high cost. Furthermore, the capacity of the crusher is limited by the fact that the bearing plates can only withstand loads up to a certain level. Moreover, a great deal of heat is generated in the thrust bearing and this heat needs to be cooled off by means of oil, which in turn needs to be cooled.

OBJECTS AND SUMMARY OF THE INVENTION

It is desired to provide a gyratory crusher in which the above drawbacks have been considerably reduced, or completely eliminated.

This object is achieved by a gyratory crusher which includes a crushing head which is fixedly attached to an upper portion of a substantially vertical shaft and on which a first crushing shell is mounted, and a frame on which a second crushing shell is mounted, the second crushing shell defining, together with the first crushing shell, a crushing gap, the width of which is adjustable by changing the vertical position of the first crushing shell with respect to the vertical position of the second crushing shell by at least one adjusting device. The gyratory crusher further includes a thrust bearing which is made up of horizontal bearing plates and which is located between the vertical shaft and a piston arranged vertically below the vertical shaft. The thrust bearing is adapted to transmit forces from the crushing head to the frame. The gyrator crusher further includes a first space adapted to receive a variable amount of pressurized liquid, the first space being defined by the piston and a piston housing formed in the frame, and a second space adapted to receive, by way of a duct, pressurized liquid from the first space, the second space being located between the vertical shaft and the piston and at least partly accommodated in at least one opening which has been formed in at least one of the bearing plates. The first space and the second space are adapted, by the liquid received in the first space and in the second space, to transmit, during operation of the crusher, vertical forces from the crushing head arranged on the vertical shaft to the piston housing, in order that the load on the thrust bearing is relieved in the vertical direction.

An advantage of this gyratory crusher is that the mechanical wear that occurs when the bearing plates slide against one another during operation of the crusher is considerably reduced by the load on the thrust bearing being relieved in the vertical direction. This substantially reduces the cost of maintaining the crusher. A further advantage is that the large power losses incurred as a result of the bearing plates rubbing against one another generating frictional heat can be significantly reduced by the load on the thrust bearing being relieved. A gyratory crusher is thus provided which in operation consumes less energy than previously known crushers. Previously, the mean crushing force of the crusher, for example, the load in the form of feed material to be crushed, that the crusher can withstand has been limited by the strength of the bearing plates and by the heat generation in the sliding surfaces of the thrust bearing. By relieving the load on the bearing plates it is thus possible to increase the mean crushing force of the crusher and/or its capacity, since the crusher is able to withstand higher loads with maintained strength as regards the bearing plates.

According to a particular embodiment, the first space is included in the adjusting device, the first space being adapted to receive a variable amount of liquid for setting the desired vertical position of the first crushing shell. An advantage of this embodiment is that the space will have the double functions of transmitting, on the one hand, vertical forces from the crushing head to the frame and of serving, on the other hand, as an adjusting device for vertical adjustment of the crushing head and, thus, of the first crushing shell by virtue of the fact that a variable amount of liquid can be supplied to the first space. This means that no separate adjusting device is needed for adjusting the vertical position of the first crushing shell with respect to the vertical position of the second crushing shell.

In a certain embodiment, the duct is formed inside the piston, which enables a robust solution involving few parts.

In a particular embodiment, the first space and the second space are adapted to transmit, by means of the received liquid, at least 50%, and more preferred at least 75%, of the vertical force generated during crushing from the vertical shaft directly to the piston housing. As a result, the vertical load on the thrust bearing made up of bearing plates is considerably reduced, which results in less wear of the bearing plates. In addition, the power losses are reduced by virtue of the fact that with a smaller load on the bearing plates less heat is generated in the thrust bearing.

In a particular embodiment, the second space is adapted by means of the liquid received therein to relieve the load on the bearing plates to such a degree that less than 50%, and more preferred less than 25%, of the vertical forces that are transmitted from the vertical shaft to the piston housing pass through the thrust bearing. An advantage of this embodiment is that it is possible to significantly reduce the wear of the bearing plates as well as power losses in the thrust bearing.

According to one embodiment, a pocket has been formed in at least one sliding surface between the bearing plates, the pocket serving, during operation of the crusher, as a hydrostatic bearing. In some cases a hydrostatic bearing can help to further reduce the wear and to improve the lubrication of the thrust bearing. Suitably, at least one constriction is provided in the duct. An advantage of this embodiment is that an excessively large flow of liquid to the hydrostatic bearing can be avoided.

A further desire is to provide a simple method of supporting a substantially vertical shaft in a gyratory crusher, which method involves lower maintenance costs than the methods known in the art.

This object can be achieved by a method of supporting a substantially vertical shaft in a gyratory crusher, which includes a crushing head which is fixedly attached to an upper portion of a substantially vertical shaft and on which a first crushing shell is mounted, and a frame on which a second crushing shell is mounted, the second crushing shell defining, together with the first crushing shell, a crushing gap, the width of which is adjustable by changing the vertical position of the first crushing shell with respect to the vertical position of the second crushing shell by at least one adjusting device. The gyratory crusher further includes a thrust bearing, which is made up of horizontal bearing plates and which is located between the vertical shaft and a piston arranged vertically below the vertical shaft. The thrust bearing is adapted to transmit forces from the crushing head to the frame. The method further includes supplying liquid to a first space, which is adapted to receive a variable amount of pressurized liquid, the first space being defined by the piston and a piston housing formed in the frame. The first space is adapted, by the liquid, to transmit, during operation of the crusher, vertical forces from the shaft to the piston housing. Further, liquid is supplied to a second space from the first space by way of a duct, the second space being located between the vertical shaft and the piston and at least partly accommodated in at least one opening which has been formed in at least one of the bearing plates. The second space is adapted, by the pressurized liquid, to generate, during operation of the crusher, an upward force acting on the vertical shaft, in order that the load on the thrust bearing is relieved in the vertical direction.

An advantage of this method is that a bearing is provided in the axial direction between the crushing head and the frame in a manner that involves low maintenance costs due to the fact that mechanical wear and power losses are reduced by relieving the load on the bearing plates.

In a particular embodiment, the second space relieves the load on the bearing plates, by means of the liquid supplied to the second space, to such a degree that less than 50%, and more preferred less than 25%, of the vertical forces transmitted from the shaft to the piston housing pass through the bearing plates of the thrust bearing, as a result of which wear of the bearing plates and power losses can be significantly reduced.

According to one embodiment, the liquid pressure in the second space is maintained at substantially the same level as the liquid pressure in the first space. An advantage of this embodiment is that a predictable upward force will act on the vertical shaft, which means that a desired relieving of the load on the thrust bearing is achieved, without the risk of play occurring in the thrust bearing. As the pressure is substantially the same in the first and second spaces, it is only the proportion between the respective horizontal pressure areas on which the pressure is acting that determines how much of the vertical forces pass through the thrust bearings and how much pass through the first and second spaces.

It is to be understood that both the foregoing general description and the following detailed description are exemplary and explanatory and are intended to provide further explanation of the invention as claimed.

BRIEF DESCRIPTION OF THE DRAWINGS

The following detailed description can be read in connection with the accompanying drawings in which like numerals designate like elements and in which:

FIG. 1b is a schematic, enlarged view of a portion of the gyratory crusher shown in FIG. 1a.

FIG. 1c is a schematic, enlarged view of a portion of the gyratory crusher shown in FIG. 1a.

FIG. 2b is a schematic, enlarged view of a portion of the gyratory crusher shown in FIG. 2a.

FIG. 2c is a schematic, enlarged view of a portion of the gyratory crusher shown in FIG. 2a.

DETAILED DESCRIPTION OF THE PREFERRED EMBODIMENTS

Figure 1A:
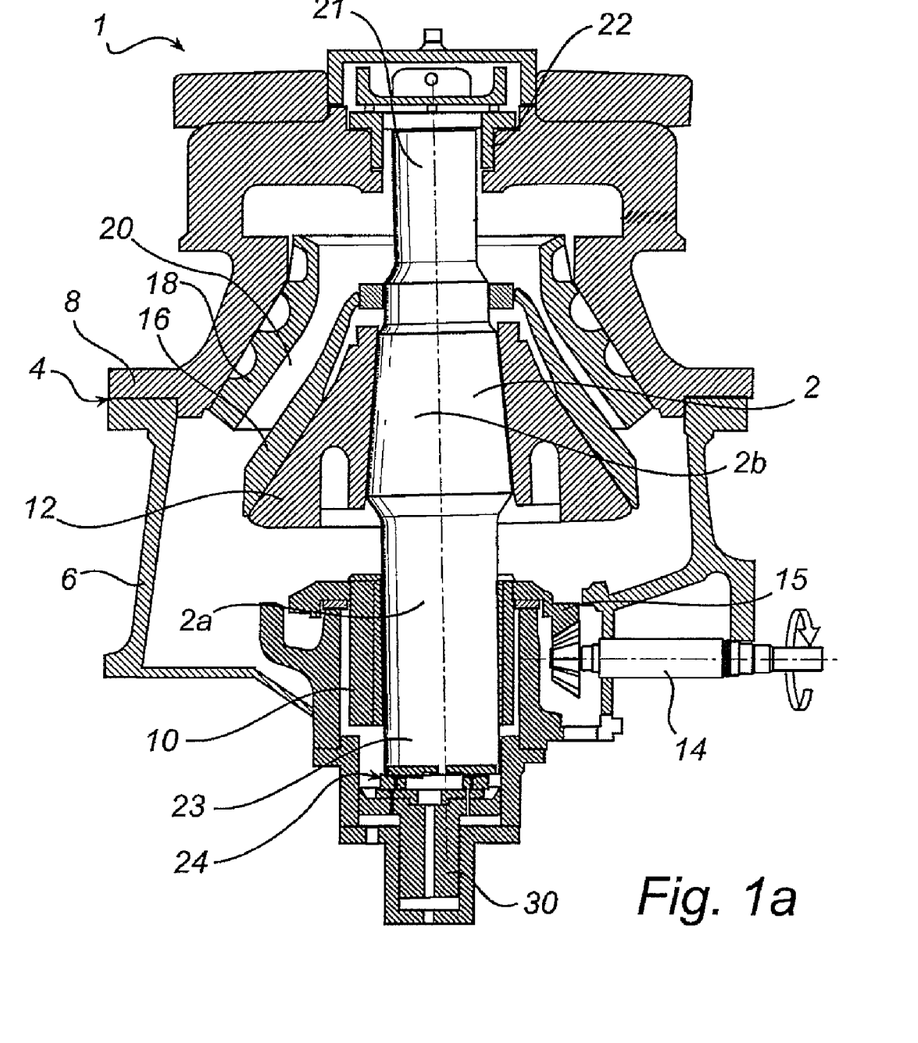
FIG. 1a is a schematic view of a gyratory crusher according to a first embodiment.

FIG. 1a illustrates schematically a gyratory crusher 1 according to a first embodiment. The gyratory crusher 1 has a vertical shaft 2 and a frame 4 including a frame bottom part 6 and a frame top part 8. An eccentric device in the form of an eccentric 10 is rotatably arranged about the lower portion 2a of the shaft 2. A crushing head 12 is fixedly mounted on an upper portion 2b of the shaft 2. A drive shaft 14 is arranged to rotate the eccentric 10 by means of a motor (not shown) and a gear rim 15 mounted on the eccentric 10. The vertical shaft 2 is carried at its upper end 21 in a top bearing 22 in the frame top part 8. When the drive shaft 14 rotates the eccentric 10, during operation of the crusher 1, the shaft 2 and the crushing head 12 mounted thereon will execute a gyrating movement.

A first crushing shell 16 is fixedly mounted on the crushing head 12. A second crushing shell 18 is fixedly mounted on the frame top part 8. A crushing gap 20 is formed between the two crushing shells 16, 18. A material to be crushed is introduced in the crushing gap 20 and is crushed between the first crushing shell 16 and the second crushing shell 18 as a result of the gyrating movement of the crushing head 12, during which movement the two crushing shells 16, 18 approach one another along a rotating generatrix and move away from one another along a diametrically opposed generatrix.

Figure 1B:
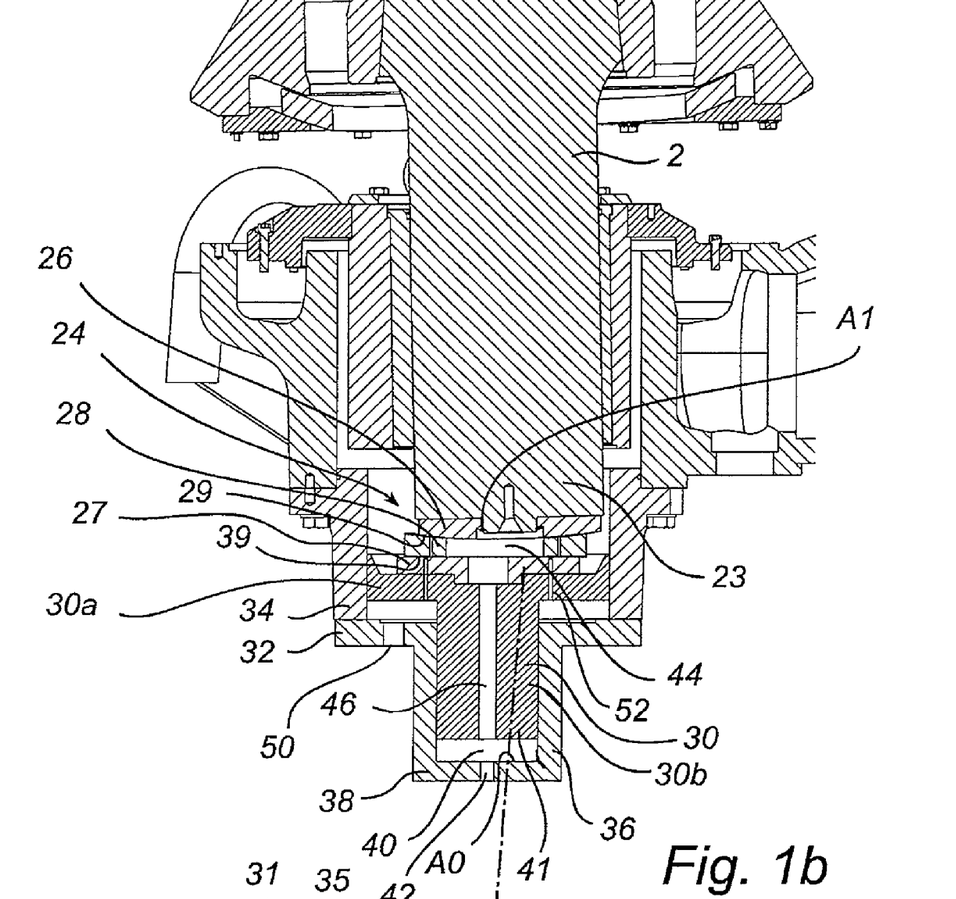

In the following the gyratory crusher 1 shown in FIG. 1a will be described in greater detail, reference being made to FIG. 1b and FIG. 1c. FIG. 1b is a schematic, enlarged view of a portion of the gyratory crusher 1 shown in FIG. 1a. At its lower end 23 the vertical shaft 2 is supported on a thrust bearing 24 made up of horizontal bearing plates, the thrust bearing including, in the present embodiment, three horizontal bearing plates 26, 27, 28. The first bearing plate 26, which has a convex underside, is attached to the vertical shaft 2. The second bearing plate 27 is attached to a piston 30 which is arranged vertically below the vertical shaft 2 and which runs in a piston housing 32. The third bearing plate 28, which has a concave upper side, is slidably and rotatably arranged between the first bearing plate 26 and the second bearing plate 27. The thrust bearing 24 thus has an upper sliding surface 29, which is formed between the first bearing plate 26 and the third bearing plate 28, and a lower sliding surface 39, which is formed between the second bearing plate 27 and the third bearing plate 28. In other words, the thrust bearing 24 is supported by the piston 30 by way of the lower bearing plate 27 and is thus adapted to transmit vertical forces from the vertical shaft 2 to the piston 30.

Figure 1C:
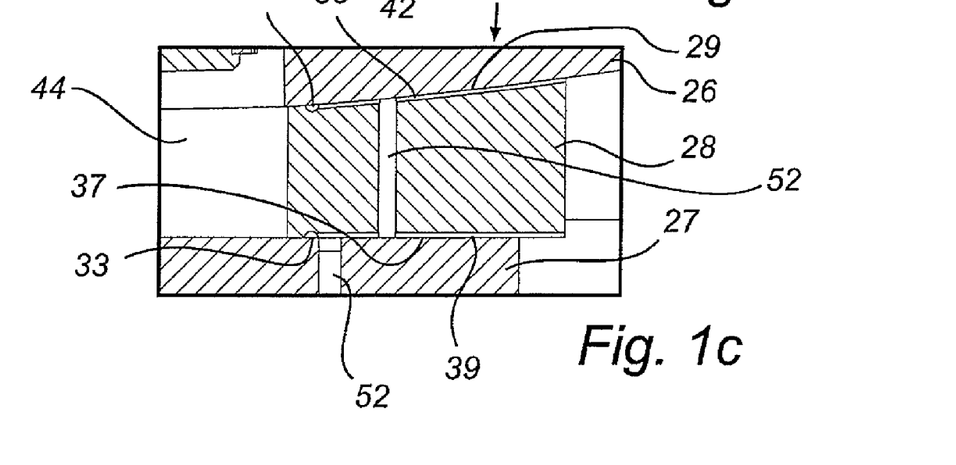

The upper and lower boundary surfaces of the third bearing plate 28 are here provided with circular drain grooves 31, 33 which run close to the inner radius thereof, as is illustrated in FIG. 1c. Furthermore, the upper and lower boundary surfaces of the third bearing plate 28 are provided with a number of radial grooves 35, 37, which extend from the respective circular drain grooves 31, 33 towards the periphery of the bearing plate 28. The first bearing plate 26 and the second bearing plate 27 are generally made of steel, whereas the third bearing plate 28 is often made of a bearing metal, such as bronze.

As is evident from FIG. 1b, the piston 30 has an upper portion 30a, which runs in an upper cylinder 34 formed in the piston housing 32, and a lower portion 30b, which runs in a lower cylinder 36 formed in the piston housing 32. The upper portion 30a of the piston 30 has a larger diameter than the lower portion 30b thereof. The upper cylinder 34 and the lower cylinder 36 have been formed inside the frame bottom part 6 and, together with a cylinder bottom 38, which has also been formed in the frame bottom part 6, make up the piston housing 32.

The gyratory crusher 1 includes a first space 40 which is adapted to contain a pressurized liquid, such as hydraulic oil or lubricating oil. The space 40 is defined by the lower cylinder 36, the cylinder bottom 38 and the lower end 41 of the piston 30. The lower end 41 of the piston 30, together with the lower cylinder 36 and the cylinder bottom 38, form part of a hydraulic piston arrangement by means of which the vertical position of the vertical shaft 2 can be shifted for setting of a desired crushing gap 20 between the first 16 and the second 18 crushing shell. Vertical shifting of the shaft 2 is achieved by regulating the pressure and the amount of liquid in the space 40. A liquid can be supplied to the first space 40 by means of a pump (not shown) from a liquid supply (not shown) via a conduit 42 provided in the cylinder bottom 38. The conduit 42 also enables the evacuation of liquid from the space 40. The liquid received in the space 40 transmits vertically oriented forces from the shaft 2 to the cylinder bottom 38. Because the cylinder bottom 38 is fixedly connected to the frame bottom part 6 the forces will be taken up by the frame 4. The first space 40 is thus adapted by means of the received liquid to transmit, during operation of the crusher 1, vertically oriented forces from the shaft 2 to the piston housing 32 and then to the frame 4. The force F0 which is transmitted by the liquid received in the space 40 to the piston housing 32 is equal to the product of the pressure P of the liquid in the space 40 and the horizontal pressure area A0 formed at the bottom 38 of the piston housing 32, i.e., $F0 = P \times A0$.

The gyratory crusher 1 further includes a second space 44, which is adapted to contain a liquid, such as hydraulic oil or lubricating oil. The space 44, which is located between the lower end 23 of the vertical shaft 2 and the piston 30, is here accommodated in central through openings in the bearing plates 26, 27, 28. Accordingly, the space 44 is here defined by the lower end 23 of the shaft 2, the bearing plates 26, 27, 28 and a portion of the upper end of the piston 30. The second space 44 is connected by way of a duct 46 formed in the piston 30 with the first space 40. This enables oil to flow freely between the space 40 below the piston 30 and the space 44 above the piston 30. Consequently, not taking into account the pressure generated by the difference in altitude, which is negligible in this context, the pressure of the oil contained in the space 44 will be essentially the same as the pressure P of the oil in the space 40. The liquid received in the second space 44 acts on a horizontal pressure area A1 formed in the space 44 and thereby generates an upward force F1 acting on the shaft 2. In terms of magnitude, the force F1 is equal to the product of the pressure P and the horizontal pressure area A1 for example, $F1 = P \times A1$. The first space 40 and the second space 44 are thus adapted, by the liquid received in the respective spaces 40, 44, to transmit, during operation of the crusher 1, vertical forces from the shaft 2 to the piston housing 32, whereby the load on the thrust bearing 24 carried by the piston 30 and supported thereon is relieved in the vertical direction. Part of the vertical forces are thus transmitted from the lower end 23 of the shaft 2 directly to the piston housing 32 without exerting a load on the bearing plates 26, 27, 28 of the thrust bearing 24.

Consequently, when liquid has been supplied to the first space 40, and thus by way of the duct 46 also to the second space 44, an upward force F1 acts on the vertical shaft 2. Because of the upward force F1 that acts on the shaft 2, the load on the two sliding surfaces 29, 39 of the thrust bearing 24 is relieved. The proportion between the two horizontal pressure areas A0 and A1 determines to what extent the load on the thrust bearing 24 is relieved. Thus, by defining a suitable proportion between A0 and A1 it is possible to decide how much of the force transmitted from the shaft 2 to the piston housing 32 will be transmitted by way of the thrust bearing 24 and how much will be transmitted directly from the shaft 2 to the piston housing 32 by way of the liquid in the spaces 40 and 44 and the duct 46 extending therebetween. Particularly, the force F1 is smaller than the force F0 in order to prevent the occurrence of play in the thrust bearing 24. In this embodiment, the horizontal pressure area A0 and the horizontal pressure area A1 of the space 44 are dimensioned such that about one tenth, or approximately 10%, of the vertical force transmitted from the shaft 2 to the piston housing 32 passes through the bearing plates 26, 27, 28 of the thrust bearing 24, or, approximately 90% of the vertical force transmitted from the shaft 2 to the piston housing 32 is transmitted from the shaft 2 to the piston housing 32 by the liquid in the spaces 40 and 44 and the duct 46 extending therebetween, which means that the power losses and the wear of the bearing plates 26, 27, 28 can be significantly reduced as compared with the solution that is disclosed in WO 99/22869, where the whole vertical force from the vertical shaft passes through the thrust bearing 24 made up of bearing plates. The proportion between A0 and A1 has further been dimensioned such that the force F1, which acts on the horizontal pressure area A1 and which, therefore, has a tendency to lift the upper bearing plate 26 attached to the lower end 23 of the vertical shaft 2, is not great enough to create a gap between the upper bearing plate 26 and the intermediate bearing plate 28. A gap of this kind is not desirable in the present case, since it could cause uncontrolled leakage of oil at high pressure in the sliding surfaces 29, 39. Since the liquid pressure is substantially the same in both spaces 40, 44, and the force is equal to the product of the liquid pressure and the pressure area, the second pressure area A1 represents, in the present embodiment, approximately 90% of the first pressure area A0 which means that the upward force F1 that acts on the second pressure area A1 and that relieves the load on the thrust bearing 24 represents approximately 90% of the force F0 which is transmitted from the shaft 2 to the piston housing 32, which acts on the first pressure area A0 Consequently, the thrust bearing 24 is subjected to only about 10% of the force F0 or, to only about 10% of the force which, as a result of the crushing work performed in the gyratory crusher 1, needs to be transmitted from the shaft 2 to the piston housing 32 and onto the frame 4.

The function can thus be described as follows: the first space 40, the duct 46 and the second space 44 together form a pressurized liquid column, which stands on the bottom 38 of the piston housing 32, extends through the thrust bearing 24 all the way up to the vertical shaft 2 and, in the present embodiment, carries 90% of the downwardly exerted force of the vertical shaft 2. And so only 10% of the downwardly exerted force of the vertical shaft 2 will be conveyed, in the present embodiment, from the vertical shaft 2 via the thrust bearing 24 to the piston 30. This means that the wear on the sliding surfaces 29 and 39 of the thrust bearing 24 and the loss due to friction therein will be significantly reduced.

As has been mentioned previously, the piston 30 has an upper portion 30a which is of larger diameter and which runs in the upper cylinder 34. The contact between the upper portion 30a of the piston 30 and the upper cylinder 34 serves to support the piston 30 in the radial direction.

Because of the considerable variation in the vertical forces and the strong vibrations that occur in a crusher, oil under high pressure might seep out in the upper sliding surface 29 and/or lower sliding surface 39, where it builds up an oil film that provides a lifting force strong enough to create a leakage gap. To avoid this scenario the circular drain grooves 31, 33 shown in FIG. 1c have been arranged to receive the oil, if any, that may leak from the space 44. The radial grooves 35, 37 shown in FIG. 1c have been arranged to ensure that the oil is evacuated from the drain grooves 31, 33 in a controlled manner, without the oil creating a leakage gap. Alternatively, or in combination with drain grooves, a sealing ring can be arranged in the respective sliding surface to prevent the formation of a non-desirable leakage gap.

The high-pressure liquid from the space 44 that passes through the sliding surfaces 29, 39 of the thrust bearing 24 provides a certain amount of cooling and lubrication of the sliding surfaces 29, 39. To further improve the lubrication and cooling of the sliding surfaces 29, 39, oil is pumped at low pressure to the upper cylinder 34 through a duct 50 in the piston housing 32 and through axial holes 52 in the piston 30 and in the second and third bearing plates 27, 28 to the two sliding surfaces 29, 39 of the thrust bearing 24. The oil is then extracted through the radial grooves 35, 37. The oil that is extracted from the sliding surfaces 29, 39 via the drain grooves 35, 37 is then conveyed upwards to, inter alia, radial slide bearings arranged in the crusher.

Figure 2A:
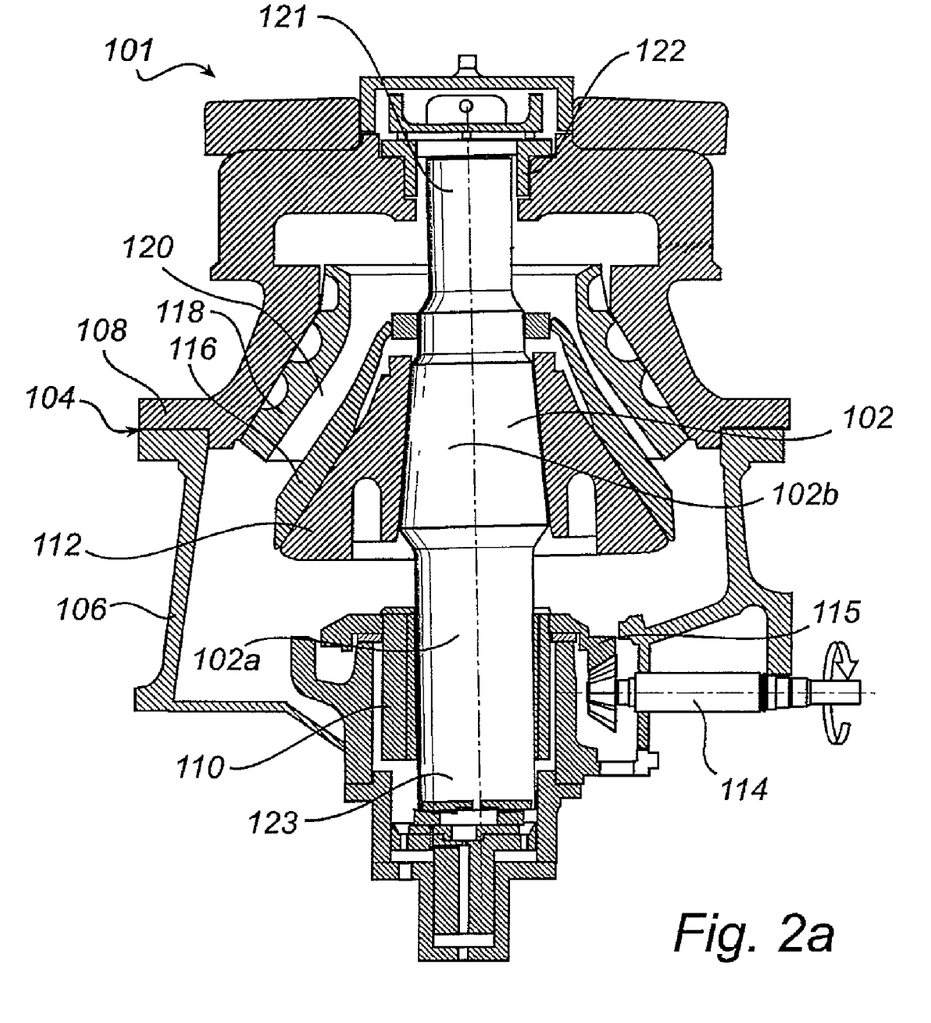
FIG. 2a is a schematic view of a gyratory crusher according to a second embodiment.

FIG. 2a illustrates schematically a gyratory crusher 101 according to an alternative embodiment.

The gyratory crusher 101 has a vertical shaft 102 and a frame 104 including a frame bottom part 106 and a frame top part 108. An eccentric device in the form of an eccentric 110 is rotatably arranged about the lower portion 102a of the shaft 102. A crushing head 112 is fixedly mounted on an upper portion 102b of the shaft 102. A drive shaft 114 is arranged to rotate the eccentric 110 by means of a motor (not shown) and a gear rim 115 mounted on the eccentric 110. The vertical shaft 102 is carried at its upper end 121 in a top bearing 122 in the frame top part 108. When the drive shaft 114 rotates the eccentric 110, during operation of the crusher 101, the shaft 102 and the crushing head 112 mounted thereon will execute a gyrating movement.

A first crushing shell 116 is fixedly mounted on the crushing head 112. A second crushing shell 118 is fixedly mounted on the frame top part 118. A crushing gap 120 is formed between the two crushing shells 116, 118. A material to be crushed is introduced in the crushing gap 120 and is crushed between the first crushing shell 116 and the second crushing shell 118 as a result of the gyrating movement of the crushing head 112, during which movement the two crushing shells 116, 118 approach one another along a rotating generatrix and move away from one another along a diametrically opposed generatrix.

Figures 2B, 2C:
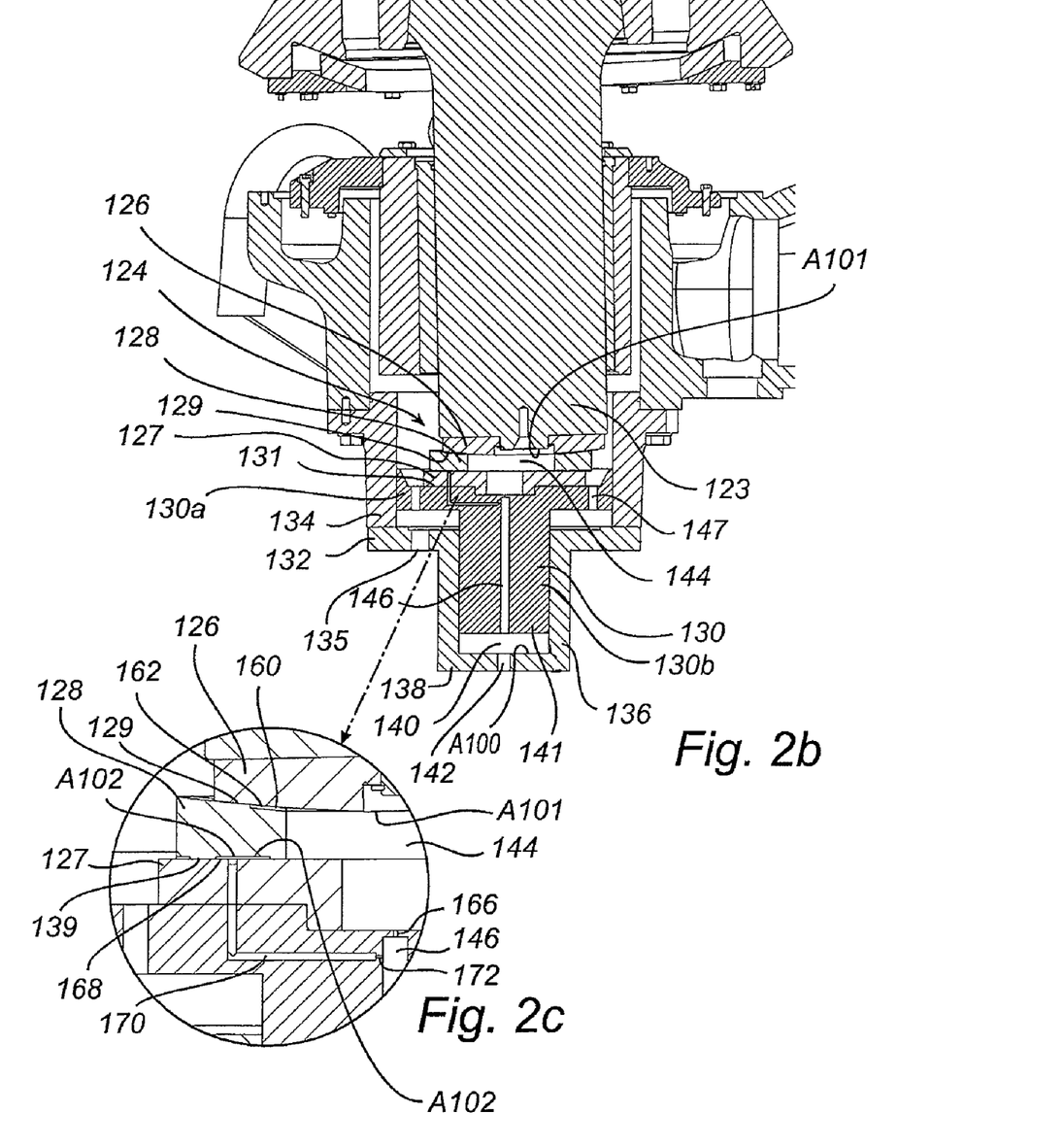

In the following the gyratory crusher shown in FIG. 2a will be described in greater detail, reference being made to FIG. 2b and FIG. 2c. FIG. 2b is a schematic, enlarged view of a portion of the gyratory crusher 101 shown in FIG. 2a. At its lower end 123 the vertical shaft 102 is supported on a thrust bearing 124 made up of horizontal bearing plates, the thrust bearing 124 including, in the present embodiment, three horizontal bearing plates 126, 127, 128. The first bearing plate 126, which has a convex underside, is attached to the vertical shaft 102. The second bearing plate 127 is attached to a piston 130, which is arranged vertically below the vertical shaft 102 and which runs in a piston housing 132. The third bearing plate 128, which has a concave upper side, is slidably and rotatably arranged between the first bearing plate 126 and the second bearing plate 127. The thrust bearing 124 thus has an upper sliding surface 129, which is formed between the first bearing plate 126 and the third bearing plate 128, and a lower sliding surface 139, clearly shown in FIG. 2c, which is formed between the second bearing plate 127 and the third bearing plate 128. In other words, the thrust bearing 124 is supported by the piston 130 by way of the lower bearing plate 127 and is thus adapted to transmit vertical forces from the vertical shaft 102 to the piston 130. The first bearing plate 126 and the second bearing plate 127 are generally made of steel, whereas the third bearing plate 128 is often made of a bearing metal, such as bronze.

The piston 130 has an upper portion 130a, which runs in an upper cylinder 134 formed in the piston housing 132, and a lower portion 130b, which runs in a lower cylinder 136 formed in the piston housing 132. The upper portion 130a of the piston 130 has a larger diameter than the lower portion 130b thereof. The upper cylinder 134 and the lower cylinder 136 have been formed inside the frame bottom part 106 and, together with a cylinder bottom 138, thus make up the piston housing 132.

The gyratory crusher 101 includes a first space 140, which is adapted to contain a liquid, such as hydraulic oil or lubricating oil. The space 140 is defined by the lower cylinder 136, the cylinder bottom 138 and the lower end 141 of the piston 130. The lower end 141 of the piston 130, together with the lower cylinder 136 and the cylinder bottom 138, forms part of a hydraulic piston arrangement by means of which the vertical position of the vertical shaft 102 can be shifted for setting of a desired crushing gap 120 between the first crushing shell 116 and the second crushing shell 118. Vertical shifting of the shaft 102 is achieved by regulating the pressure and the amount of liquid in the space 140. A liquid can be supplied to the first space 140 by means of a pump (not shown) from a liquid supply (not shown) via a conduit 142 provided in the cylinder bottom 138. The conduit 142 also enables the evacuation of liquid from the space 140. The liquid received in the space 140 transmits vertically oriented forces from the shaft 102 to the cylinder bottom 138. Because the cylinder bottom 138 is fixedly connected to the frame bottom part 106 the forces will be taken up by the frame 104. The force F100 which is transmitted by the liquid received in the space 140 to the piston housing 132 is equal to the product of the pressure P of the liquid in the space 140 and the horizontal pressure area A100 formed at the bottom 138 of the piston housing 132.

The gyratory crusher 101 further includes a second space 144, which is adapted to contain a liquid, such as hydraulic oil or lubricating oil. The second space 144, which is located between the vertical shaft 102 and the piston 130, is here accommodated in through openings formed in the bearing plates 126, 127, 128. Accordingly, the space 144 is here defined by the lower end 123 of the shaft 102, the bearing plates 126, 127, 128 and a portion of the upper end of the piston 130.

As is best shown in FIG. 2c, an upper oil pocket 162 has been provided in the upper sliding surface 129 by means of a recess 160 in the upper boundary surface of the third bearing plate 128, the upper oil pocket 162 forming part of the second space 144. Liquid can be supplied to the second space 144 from the first space 140 by way of a duct 146 formed in the piston 130. A first constriction 166, in the form of a section of reduced cross-sectional area provided in the duct 146, has been arranged to ensure that the pressure of the liquid received in the space 144 is lower than the pressure of the liquid received in the space 140.

In this embodiment, the gyratory crusher 101 further includes a third space 168, in the form of a lower oil pocket, which is formed between the second bearing plate 127 and the third bearing plate 128, for example, adjacent to the lower sliding surface 139. The third space 168 includes a recess formed in the lower boundary surface of the third bearing plate 128. Liquid can be supplied to the space 168 from the first space 140 by way of a duct 170, which is formed partly in the second bearing plate 127 and partly in the piston 130 and which is connected with the duct 146 formed in the piston 130. A second constriction 172, in the form of a section of reduced cross-sectional area provided in the duct 170, has been arranged to ensure that the pressure of the liquid received in the third space 168 is lower than the pressure of the liquid received in the space 140.

This enables the pressurized liquid in the space 140 to flow upwards through the duct 146. The flow of the oil through the duct 146 is determined by the two constrictions 166, 172, which are located in the upper part of the piston 130. Suitably, the two constrictions 166, 172 are dimensioned such that the flow is distributed substantially equally between the space 144 and the space 168. Moreover, the constrictions are suitably dimensioned such that the pressure in the first space 140 is large enough to provide a flow for the spaces 144 and 168 that is large enough to generate the desired upward force, while at the same time the outflow via the two sliding surfaces 129, 139 is not unnecessarily large. The pressure in the second space 144 is proportional to the load to which the piston 130 is exposed. This is advantageous since the pressure in the pressure medium underneath the piston 130 will increase when the crusher is exposed to extremely high loads, for example when uncrushable material passes through the crusher. Consequently, the carrying capacity of the two spaces 144, 168 increases with increasing loads.

When the pump (not shown) starts and oil is pumped in under the piston 130 in the first space 140, there will initially be no oil in the two sliding surfaces 129, 139 of the thrust bearing 124. Therefore, the pressure of the oil supplied to the space 144 and the space 168 needs initially to be high enough to lift the bearing plates 126, 127, 128 so as to separate them at the sliding surfaces 129, 139. Oil will then flow from the thrust bearing 124 through the thin oil gap that is formed in the two sliding surfaces 129, 139. Thus, in this embodiment, the thrust bearing 124 serves as a hydrostatic bearing which, through the supply of oil at high pressure and by means of the space 144, of which the oil pocket 162 is an integral part, and the space 168, forms a load-bearing oil film in the two sliding surfaces 129, 139 of the thrust bearing 124, as a result of which wear of the bearing plates 126, 127, 128 and power losses can be significantly reduced. The basic principle of a hydrostatic bearing of this type is known per se in the art and has been described in *Fundamentals of Fluid Film Lubrication*, Second Edition" by Hamrock, Bernard J. et al., 2004, ISBN 0824753712.

The thickness of the oil gap formed in the respective sliding surfaces is determined by the flow out from the thrust bearing 124, which in turn is determined by the constrictions 166, 172 described above.

In this embodiment too, the load on the thrust bearing 124 is relieved by the upward force that is achieved by virtue of the fact that the liquid in the space 144 acts on the horizontal pressure area A101.

The respective horizontal pressure areas A101 and A102 of the second space 144 and the third space 168 have here been dimensioned such that the pressure in the second space 144 is slightly higher that the pressure in the third space 168. This means that a small amount of oil will flow from the second space 144 along the lower sliding surface 139, which is thus lubricated, to the third space 168.

The oil that flows out through the sliding surfaces 129, 139 contributes to the lubrication and cooling of the radial slide bearings that are provided higher up in the crusher. In addition, to ensure a satisfactory lubrication and cooling of the slide bearings, lubricating oil is pumped in at low pressure through a hole 135 in the upper cylinder 134 and is conveyed via ducts 147 in the piston 130 upwards to radial slide bearings arranged in the crusher and to other components of the crusher that are in need of lubrication and/or cooling. The oil that is pumped into the space 140 at high pressure via the conduit 142 and the oil that is pumped in at low pressure through the duct 135 can be pumped from the same oil tank. This solution is thus based on the use of only one oil tank but two pumps, a high-pressure pump and a low-pressure pump. Suitably, the high-pressure pump, for example, the pump that pumps oil into the first space 140, provides a controllable supply of oil.

The piston 130 has an upper portion 130a which is of larger diameter and which runs in the upper cylinder 136. The contact between the upper portion 130a of the piston 130 and the upper cylinder 134 serves to support the piston 130 in the radial direction.

Figure 3:
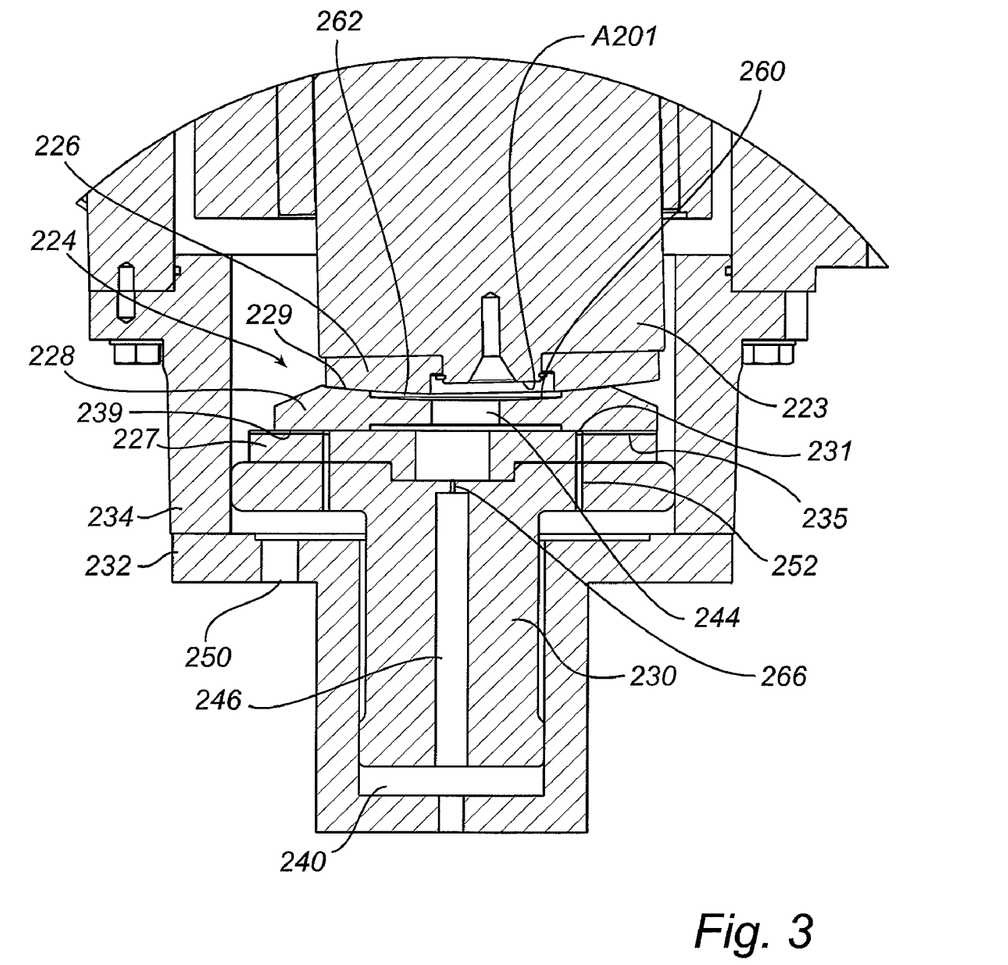
FIG. 3 is a schematic view of a portion of a gyratory crusher according to a third embodiment.

FIG. 3 shows an alternative embodiment where elements from the embodiment shown in FIG. 1a have been combined with elements from the embodiment shown in FIG. 2a. The reference numerals in FIG. 3 thus refer to elements which are similar or identical to elements that can be found in the two previously described embodiments.

Unlike the embodiment shown in FIG. 1a, the embodiment shown in FIG. 3 has a constriction 266, in the form of a section of reduced cross-sectional area provided in a duct 246, which is arranged in the upper part of the duct 246. The constriction 266 has been arranged to ensure that the pressure of the liquid received in a second space 244 is lower than the pressure of the liquid received in a first space 240. The flow of the oil through the duct 246 is thus determined by the constriction 266. Furthermore, an upper oil pocket 262 has been provided in the upper sliding surface 229 formed between a first bearing plate 226 and a third bearing plate 228 of a thrust bearing 224 by means of a recess 260 in the upper boundary surface of the third bearing plate 228, the upper oil pocket 262 forming part of the second space 244. The constriction 266 is dimensioned such that the flow is large enough to create a small oil gap in the upper sliding surface 229.

Thus, the upper sliding surface 229 of the thrust bearing 224 has the same function as the upper sliding surface 129 of the second embodiment described above, for example, it serves as a hydrostatic bearing, which through the supply of oil at high pressure forms a load-bearing oil film in the upper sliding surface 229 of the thrust bearing 224. As a result the wear of the first bearing plate 226 and the third bearing plate 228 as well as the power losses are significantly reduced. The thickness of the oil gap formed in the upper sliding surface 229 is determined by the flow out from the thrust bearing 224, which in turn is determined by the constriction 266.

The lower sliding surface 239 of the thrust bearing 224 works in the same way as the lower sliding surface 39 of the embodiment described in FIGS. 1a-c. For the same reasons as those described previously with reference to FIG. 1c, a circular drain groove 231 and radial drain grooves 235 have been provided in the lower sliding surface 239. Unlike the embodiment shown in FIG. 1c, the drain grooves including the axial drain groove 231 and the radial drain grooves 235, have here been formed in a second bearing plate 227. Moreover, oil is pumped at low pressure upwards to the upper cylinder 234 through a duct 250 in the piston housing 232, a duct 252 in the piston 230 and through an axial hole in the second bearing plate 227 to the lower sliding surface 239 of the thrust bearing 224 for lubrication and cooling of the lower sliding surface 239. The oil is then evacuated through the radial grooves 235. The oil that is evacuated from the sliding surface 239 via the drain grooves 235 is then conveyed upwards to, inter alia, radial slide bearings arranged in the crusher.

The embodiment shown in FIG. 3 further has a piston housing 232, in which the piston 230 and a first space 240 are arranged in a manner similar to that which has been described with reference to FIG. 1b.

In the same way as described above, the load on the thrust bearing 224 is also in this embodiment relieved by an upward force F201, which is generated by the pressurized liquid in the second space 244 acting on the horizontal pressure area A201. Thus, a thrust bearing 224 is provided which enables the wear of the bearing plates as well as the power losses to be significantly reduced as compared with previously known thrust bearings.

It will be appreciated that various modifications of the embodiments described above are conceivable within the scope of the invention, as defined by the appended claims.

In the above description, the liquid supplied to the space 40, 140, 240 is hydraulic oil or lubricating oil. It will be appreciated that other types of liquids that are suitable for hydraulic piston arrangements can be used. For example, different types of hydraulic liquids, different types of oils, etc., can be supplied to the space 40, 140, 240.

Moreover it is possible for the second bearing plate 27, 127, 227 to form part of the piston 30, 130, 230, which has the advantage of allowing a reduced number of components.

Although described in connection with preferred embodiments thereof, it will be appreciated by those skilled in the art that additions, deletions, modifications, and substitutions not specifically described may be made without departure from the spirit and scope of the invention as defined in the appended claims.

The invention claimed is:

1. A gyratory crusher, which comprises a crushing head which is fixedly attached to an upper portion of a substantially vertical shaft and on which a first crushing shell is mounted, and a frame on which a second crushing shell is mounted, the second crushing shell defining, together with the first crushing shell, a crushing gap, the width of which is adjustable by changing the vertical position of the first crushing shell with respect to the vertical position of the second crushing shell by at least one adjusting device, wherein the gyratory crusher further comprises a thrust bearing, which is made up of horizontal bearing plates and which is located between the vertical shaft and a piston arranged vertically below the vertical shaft, the thrust bearing being adapted to transmit forces from the crushing head to the frame, and wherein the gyratory crusher further comprises
a first space, which is adapted to receive a variable amount of pressurized liquid, the first space being defined by the piston and a piston housing formed in the frame, and
a second space, which is adapted to receive, by way of a duct, pressurized liquid from the first space, the second space being located between the vertical shaft and the piston and at least partly accommodated in at least one opening which has been formed in at least one of said bearing plates, the first space and the second space being adapted, by the liquid received in the first space and in the second space, to transmit, during operation of the crusher, vertical forces from the crushing head arranged on the vertical shaft to the piston housing, in order that the load on the thrust bearing is relieved in the vertical direction.

2. The gyratory crusher according to claim 1, wherein said first space is included in said adjusting device, said first space being adapted to receive a variable amount of liquid for setting of the desired vertical position the first crushing shell.

3. The gyratory crusher according to claim 1, wherein said duct is formed inside the piston.

4. The gyratory crusher according to claim 1, wherein said first space and said second space are adapted to transmit, by means of the received liquid, at least 50% of the vertical force generated during crushing from the vertical shaft directly to the piston housing.

5. The gyratory crusher according to claim 1, wherein said second space is adapted, by the liquid received therein, to relieve the load on said bearing plates to such a degree that less than 50% of the vertical forces that are transmitted from the vertical shaft to the piston housing pass through the thrust bearing.

6. The gyratory crusher according to claim 1, wherein a pocket has been formed in at least one sliding surface between said bearing plates, said pocket serving, during operation of the crusher, as a hydrostatic bearing.

7. The gyratory crusher according to claim 6, wherein at least one constriction is provided in the duct.

8. A method of supporting a substantially vertical shaft in a gyratory crusher, which comprises a crushing head which is fixedly attached to an upper portion of a substantially vertical shaft and on which a first crushing shell is mounted, and a frame on which a second crushing shell is mounted, the second crushing shell defining, together with the first crushing shell, a crushing gap, the width of which is adjustable by changing the vertical position of the first crushing shell with respect to the vertical position of the second crushing shell by at least one adjusting device, wherein gyratory crusher further comprises a thrust bearing, which is made up of horizontal bearing plates and which is located between the vertical shaft and a piston arranged vertically below the vertical shaft, the thrust bearing being adaped to transmit forces from the crushing head to the frame, and     wherein the method further comprises supplying liquid to a first space adapted to receive a variable amount of pressurized liquid, the first space being defined by the piston and a piston housing formed in the frame, the first space being adapted, by said liquid, to transmit, during operation of the crusher, vertical forces from the shaft to the piston housing, and     liquid is supplied to a second space from the first space by way of a duct, the second space being located between the vertical shaft and the piston and at least partly accommodated in at least one opening which has been formed in at least one of said bearing plates, the second space being adapted, by said pressurized liquid, to generate, during operation of the crusher, an upward force acting on the vertical shaft, in order that the load on the thrust bearing is relieved in the vertical direction.

9. The method according to claim 8, wherein said second space relieves, by the liquid supplied to said second space, the load on said bearing plates to such a degree that less than 50% of the vertical forces that are transmitted from the shaft to the piston housing pass through the bearing plates of the thrust bearing.

10. The method according to claim 8, wherein liquid is supplied from the first space to the second space by way of a duct provided inside the piston.

11. The method according to claim 8, wherein a liquid pressure in the second space is maintained at substantially the same level as a liquid pressure in the first space.

12. The method according to claim 8, wherein liquid is supplied, during operation of the crusher, to at least one pocket formed in a sliding surface between said bearing plates, said pocket serving, during operation of the crusher, as a hydrostatic bearing.

\* \* \* \* \*